United States Patent [19]
Okumura et al.

[11] Patent Number: 5,700,593
[45] Date of Patent: Dec. 23, 1997

[54] METAL THIN FILM MAGNETIC RECORDING MEDIUM AND MANUFACTURING METHOD THEREOF

[75] Inventors: Yoshinobu Okumura; Xingbo Yang, both of Osaka, Japan

[73] Assignee: Kubota Corporation, Osaka, Japan

[21] Appl. No.: 206,849

[22] Filed: Mar. 7, 1994

[30] Foreign Application Priority Data

Jun. 23, 1993 [JP] Japan .................................. 5-152403
Oct. 14, 1993 [JP] Japan .................................. 5-257176

[51] Int. Cl.$^6$ ................. G11B 5/66; G11B 5/70
[52] U.S. Cl. ................. 428/694 TS; 428/336; 428/694 TP; 428/694 TC; 428/694 TF; 428/900; 428/910
[58] Field of Search ............. 428/694 T, 694 TS, 428/694 TP, 694 TC, 900, 910, 336

[56] References Cited

U.S. PATENT DOCUMENTS

| | | | |
|---|---|---|---|
| 4,652,499 | 3/1987 | Howard et al. | 428/641 |
| 4,735,853 | 4/1988 | Okudaira et al. | 428/336 |
| 4,743,491 | 5/1988 | Asada et al. | 428/213 |
| 5,037,515 | 8/1991 | Tsai et al. | 204/192.15 |
| 5,302,434 | 4/1994 | Doerner et al. | 428/65.6 |
| 5,413,873 | 5/1995 | Mizukami | 428/611 |
| 5,436,047 | 7/1995 | Howard et al. | 428/64.2 |

FOREIGN PATENT DOCUMENTS

| | | |
|---|---|---|
| 4-241222 | 8/1992 | Japan . |
| 4-255908 | 9/1992 | Japan . |
| 4-255909 | 9/1992 | Japan . |

OTHER PUBLICATIONS

IEEE Transactions on Magnetics, vol. 28, No. 5, pp. 2716–2718, Jian–Chang Zhu, et al., "Side Writing Phenomena in Narrow Track Recording".

IEEE Transactions on Magnetics, vol. 29, No. 6, pp. 3691–3693, Nov. 1993, N. Mahvan, et al., "Oxidation of Seed–Layer for Imporved Magnetic & Recording Performance of Thin–Film Rigid Discs".

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57] ABSTRACT

A metal thin film magnetic recording medium comprising an underlying non-magnetic layer and a magnetic layer comprising a Co-alloy having a uni-axial magnetocrystalline anisotropy formed in this order by lamination on the surface of a non-magnetic substrate. On the substrate, are formed a seed layer comprising an oxygen-containing non-magnetic amorphous metal or a seed layer comprising a non-magnetic amorphous metal having an oxygen-containing layer (not illustrated) on the surface, and an underlying non-magnetic layer is laminated on the seed layer. Further, a seed layer comprising an amorphous Cr- or V-alloy is formed on the substrate, and an underlying non-magnetic layer is laminated on the seed layer.

19 Claims, 6 Drawing Sheets

METAL THIN FILM MAGNETIC RECORDING MEDIUM AND MANUFACTURING METHOD THEREOF

FIELD OF THE INVENTION AND RELATED STATEMENT

The present invention concerns a magnetic recording medium having a high coercive force, as well as a manufacturing method thereof.

In recent years, metal thin film magnetic recording media in which a magnetic layer comprising a Co-alloy having a uni-axial magnetocrystalline anisotropy such as CoNiCr or CoCrTa laminated by way of an underlying Cr layer on a non-magnetic substrate have been used along with the increase in the recording density of magnetic recording media.

Heretofore, an Al-alloy—NiP substrate in which an amorphous NiP plating layer is formed on an Al-alloy plate has been used as a non-magnetic substrate, and fine unevenness referred to as a texture has been mechanically fabricated along the circumferential direction on the surface thereof. The mechanical texture has a function of moderating friction between a head and a medium to improve CSS (Constant Start Stop) characteristic, as well as improving the magnetic anisotropy in the circumferential direction and the coercive force of the Co-alloy magnetic layer formed on the surface thereof. On the other hand, the underlying CP layer has a function that the Cr crystal structure constituting the underlying Cr layer causes in-plane orientation of the crystal graphic axis (c-axis) showing the magnetic anisotropy in hcp structure of the Co-alloy magnetic layer formed thereon and has a function of improving the coercive force.

Recently, reduction of the size and increase in the capacity of hard disc apparatus have been progressed more and it has been demanded for the development of a magnetic recording medium capable of coping with such trend. As the recording density of the magnetic recording medium has been increased, since the size of recording bits is made smaller, the read back amplitude has to be increased by decreasing the rising amount of a magnetic head as small as possible. For this purpose, it is necessary to decrease the flying height of the head by further smoothing a non-magnetic substrate on which a magnetic layer is formed.

Therefore, a glass substrate has been used instead of the Al-alloy—NiP substrate described above as a non-magnetic substrate, and a directional texture formed by mechanical fabrication has been replaced with an isotropic (non-directional) texture formed by chemical etching. This is because the texture formed by mechanical fabrication tends to cause burr-like protrusions, making it difficult to decrease the flying height of the head.

In addition, as the recording density has been increased, if a track pitch is reduced along with the reduction of the bit size, reading/writing (R/W) characteristics as improved more in anisotropic media then in anisotropic media as pointed out by J. G. Zhu, et al ("IEEE TRANSACTION ON MAGNETICS" Vol. 28, P 2716, issued 1992) and formation of the isotropic texture is preferred also with this view point.

OBJECT AND SUMMARY OF THE INVENTION

As has been described above, the isotropic texture has been formed for decreasing the flying height of the magnetic head and improvement of R/W characteristics, but formation of the equi-directional texture results in a problem of reducing the coercive force magnetic recording media since improvement for the magnetocrystalline anisotropy can not be expected.

It is an object of the present invention to provide a metal thin film magnetic recording medium capable of obtaining a high coercive force even when an isotropic texture is formed on a substrate, as well as a method of manufacturing thereof.

The metal thin film magnetic recording medium according to the present invention comprises an underlying non-magnetic layer and a magnetic layer containing a Co-alloy having a uni-axial magnetocrystalline anisotropy formed by lamination in this order on the surface of a non-magnetic substrate, in which a seed layer comprising an oxygen-containing amorphous non-magnetic metal or a seed layer comprising an amorphous non-magnetic metal having an oxygen containing layer on the surface is formed on the substrate, and a non-magnetic underlying layer is stacked on the seed layer. Alternatively, a seed layer comprising an amorphous Cr-alloy or V-alloy is formed on the substrate, and a non-magnetic underlying layer is stacked on the seed layer. The Cr-alloy or the V-alloy preferably contains Ta. The seed layer is continuous.

The method of manufacturing a metal thin film magnetic recording medium according to the present invention comprises forming by lamination an underlying non-magnetic layer and a magnetic layer containing a Co-alloy having a uni-axial magnetocrystalline anisotropy in this order by sputtering on the surface of a non-magnetic substrate, wherein the method comprises forming a film of a seed layer comprising an oxygen-containing a non-magnetic amorphous metal on the substrate in a mixed gas atmosphere of a rare gas and an $O_2$ gas on the substrate, and forming by lamination an underlying non-magnetic layer on the seed layer. Alternatively, the method comprises forming a film of a non-magnetic amorphous metal layer, forming an oxygen-containing layer by implantation of oxygen atoms on the surface of the metal layer thereby obtaining a seed layer having an oxygen-containing layer on the surface of the non-magnetic metal layer and forming by lamination a film of an underlying non-magnetic layer on the seed layer.

The seed layer formed by lamination on the substrate in the present invention is formed with an oxygen-containing amorphous non-magnetic metal, or has an oxygen-containing layer in which oxygen is contained (bonded) in an amorphous non-magnetic metal on the surface. "Amorphous" means herein not a complete amorphous state such as glass but means such a state in which a fine crystal texture of a nanometer size is present when it is observed locally, or such fine crystals are oriented at random, to provide a poor crystalline state as a whole. In such a state, only the halo pattern is observed by X-ray diffraction, which is the amorphous state.

Owing to the amorphous state of the seed layer, an underlying layer formed on the seed layer and, thus, crystals of the magnetic layer formed thereon can be refined, so that the coercive force of the magnetic recording medium can be improved. Further, owing to the incorporation of oxygen in the entire non-magnetic amorphous metal forming the seed layer or incorporation of oxygen in the non-magnetic amorphous metal in the oxygen-containing layer on the surface, a gas ingredient adsorbed on the surface of the substrate can be prevented from diffusing and mixing into the underlying layers or the magnetic layer upon film formation thereof, by which the coercive force of the magnetic recording medium can be improved. For attaining such an effect, it is preferred that oxygen is contained by more than 5 at %, within a range capable of maintaining the amorphous state.

In a case of forming the seed layer from non-magnetic amorphous alloys, particularly, from a Cr-alloy or V-alloy, a sufficiently higher coercive force can be obtained with no addition of oxygen as compared with the prior art. It is considered that the reason is attributable to the crystal refining effect in the underlying layer and the magnetic layer due to the amorphous state of the seed layer, as well as the crystal orientation of the underlying layer and the magnetic layer providing a structure for further improving the coercive force. That is, since the seed layer is constituted with a Cr- or V-alloy in the amorphous state, crystals of Cr or Cr-alloy forming the underlying layer formed thereover is mainly oriented along (211). It is therefore, considered that crystals of the Co-alloy constituting the magnetic layer formed on the under-lying layer are oriented mainly along (100), to thereby improve the coercive force. The change of the crystal orientation is also obtained for Cr, V, Cr-alloy or V-alloy containing oxygen.

DETAILED DESCRIPTION OF THE PREFERRED EMBODIMENTS

Figure 1:
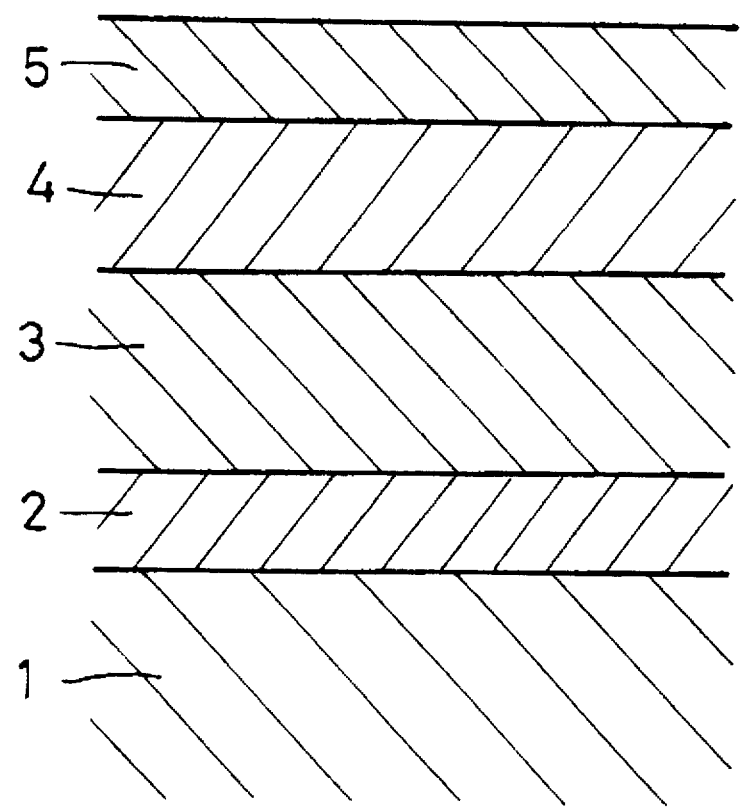
FIG. 1 is a cross sectional view of a principal part of a metal thin film magnetic recording medium according to a preferred embodiment.

FIG. 1 is a cross sectional view of a principal part of a magnetic recording medium according to a preferred embodiment, in which a seed layer 2 and an underlying non-magnetic layer 3 formed with crystalline Cr or a Cr-alloy having a similar crystal structure with that of Cr is formed on a non-magnetic substrate 1, a magnetic layer 4 comprising a Co-alloy having a uni-axial magnetocrystalline anisotropy is formed thereover and a protection layer 5 is formed further thereover by lamination.

As the substrate 1, various substrates can be used such as the Al-alloy—NiP plating substrate described above, a substrate made of a corrosion resistant light weight metal material such as titanium, a substrate made of an inorganic material such as glass, crystalline glass, ceramics and carbon, and a substrate made of an organic material such as polymer. A fine undulating fabrication referred as a texture is usually applied to the surface of the substrate so as to moderate the frictional contact resistance with a magnetic head. In the present invention, the texture is not necessarily formed along the circumferential direction but it may be an isotropic texture and, further, the texture itself may be saved. In the case of using the substrate made of the inorganic material, it is beter to form a crystalline metal film thereon prior to forming the seed layer 2. When the underlying layer 3 and the magnetic layer 4 are formed, the surface of the seed layer 2 is heated. At this time, preformation of the crystalline metal film enables the surface of the seed layer to be readily heated to high temparature, which makes it possible to contribute to improve a coerive force. Cr is most suitable as the crystalline metal because of good adhension with the substrate.

The seed layer 2 formed on the substrate 1 is entirely formed with an oxygen-containing non-magnetic amorphous metal formed with non-magnetic amorphous metal having an oxygen containing layer on the surface (not illustrated), or formed with an amorphous Cr-alloy or V-alloy not containing oxygen.

The seed layer 2 may be formed entirely with an oxygen-containing non-magnetic amorphous metal by sputtering using, for example, pure Cr, pure V, pure Ti, or a Cr-, V- or Ti-alloy having an alloy composition providing an amorphous structure as a target, in a mixed gas atmosphere of gaseous oxygen and an Ar gas as a sputtering gas. Further, it may be formed by forming a non-magnetic amorphous alloy layer on a substrate by using an Ar sputtering gas and then incorporating oxygen atoms into the alloy by ion implantation of them into the alloy layer. As the sputtering gas, an Ar gas is used usually and other rare gas such as Ne may also be used.

As the amorphous alloy, the followings can be exemplified. As the Cr alloy, there can be mentioned, for example, CrTa (Ta: 12–60 at %), CrTaNb (Ta, Nb in total: 12–60 at %), CrTaN (Ta: 12–60 at %, N: 5–30 at %), CrNb (Nb: 12–60 at %), CrSi (Si: 20–70 at %), CrAl (Al: 30–60 at %), CrB (B: 10–30 at %), CrN (N: 10–30 at %), CrBN (B, N in total: 10–30 at %), CrC (C: 10–30 at %), CrTi (Ti: 40–60 at %). As the V-alloy, there can be mentioned, for example, VTa(Ta: 12–60 at %), VTaNb (Ta, Nb in total: 12–60 at %), VTaN (Ta: 12–60 at %, N: 5–30 at %), VNb (Nb: 12–60 at %), VSi (Si: 20–70 at %), VAl (Al: 30–60 at %), VB (B: 10–30 at %), VN (N: 10–30 at %), VBN (B, N in total: 10–30 at %), VC (C: 10–30 at %), VTi (Ti: 40–60 at %). As the Ti-alloy, there can be mentioned TiSi (Si: 20–70 at %) and TiY (Y: 10–30 at %). Among the alloys, the Cr-alloy and the V-alloy can provide a relatively high coercive force without incorporating or bonding oxygen. Particularly, Ta-containing Cr- or V-alloy such as CrTa, CrTaN, VTa or VTaN is satisfactory. The reason for defining the alloying element used for attaining the amorphous state in the Cr-alloy and the V-alloy is that crystallization occurs if the content of the alloying element is less than the predetermined range, whereas orientation of crystals capable of improving the coercive force is difficult to obtain if the content exceeds the predetermined range.

In a case of conducting sputtering in a oxygen-containing gas mixture atmosphere, the concentration of the oxygen gas in the gas mixture is preferably set to higher than 30 vol % in DC sputtering and higher than 5 vol % in RF sputtering for making an elemental metal such as Cr or V into the amorphous state and incorporating sufficient amount of oxygen. Since oxides are formed if the concentration of the oxygen gas in the gas mixture is excessively high, it is preferably restricted to more than 80 vol % in the DC sputtering and less than 20 vol % in the RF sputtering. However, in a case of sputtering using, as a target, a non-magnetic alloy which is made amorphous by sputtering in a pure Ar gas atmosphere, a sufficient amount of oxygen can be incorporated even if the concentration of the oxygen gas is at a level lower by about 40% than the concentration described above.

On the other hand, the seed layer may be formed with an non-magnetic amorphous metal having an oxygen containing layer on the surface, by forming a film of a non-magnetic amorphous metal layer on a substrate and, subsequently, applying implantation of oxygen atom to the surface. That is, when the oxygen gas is blown into plasmas, oxygen is activated by the energy of the plasmas. If a substrate, on which an amorphous non-metal layer is formed, is disposed in such an activated oxygen atmosphere, oxygen atoms are bonded with metal atoms present on the surface of the amorphous non-metal layer, thereby forming an oxygen-containing layer on the surface. The content of oxygen can be easily controlled by an oxygen gas pressure, processing time or the like.

The thickness of the seed layer 2 is preferably greater than 100 Å (preferably, 200 Å) so that a continuous film is obtained. The underlying layer 3 is usually formed to a thickness of greater than about 300 Å. The total thickness for the seed layer 2 and the underlying layer 3 may be less than about 2,000 Å.

The magnetic layer 4 can be formed with any of Co alloys such as CoNiCr, CoCrTa and CoCrPt so long as it exhibits the uniaxial magnetocrystalline anisotropy. Upon forming a film of the non-magnetic layer, a negative bias voltage is preferably applied to a substrate in the same way as in the case of forming a film of the underlying layer. The level of the bias voltage is, for example, about from −200 to −300 V for Al-alloy—NiP substrate and about from 0 to −200 V for the glass substrate. The magnetic layer is not restricted only to the layer that is formed as a single layer as in the illustrated example but a Co alloy layer and a non-magnetic intermediate layer comprising Cr or Cr-alloy having the similar crystal structure to that of Cr may be laminated alternately. The thickness of the magnetic layer 4 (thickness of one layer in a case of the single layer or the total thickness in the case of the composite layer) is usually about from 150 to 800 Å. This is because a magnetic recording medium having Brδ of about from 100 to 500 G.μm is required for ensuring a regeneration output and reducing noises.

On the magnetic layer 4, is formed a non-magnetic protection layer made of C, $SiO_2$ or the like to about 100 to 300 Å and, usually, a liquid lubricant such as a perfluoroplyether is coated, for example by dipping method, further thereover to about 20 to 50 Å (about the thickness of a single molecule) to form a lubrication layer.

The underlying layer, the magnetic layer and the protection layer can be formed by various deposition methods and they are usually formed by sputtering. Sputtering can be applied usually under the conditions at a pressure at 1 to 30 m Torr for Ar gas or a gas mixture and at a heating temperature to a substrate of about 250° to 350° C. for the Al alloy—Nip substrate so that NiP is not crystallized or at a temperature higher by about 100° C. than that for the glass substrate.

Concrete examples will now be described.

EXAMPLE A (1) On a glass substrate applied with isotropic texturing, Cr was sputtered in an atmosphere of an Ar—$O_2$ gas mixture (gas mixture pressure of 15 mTorr) at each of various $O_2$ gas concentrations, to form a seed layer to 300 Å. Then, under a substrate temperature of 270° C. and an Ar gas pressure of 8 mTorr, were formed an underlying Cr layer to 700 Å, a magnetic layer of Co—10 at % Cr—4 at % Ta to 350 Å and a protection film comprising amorphous C to 200 Å continuously by sputtering. In this case, a bias voltage at −100V was applied to the substrate. As a film forming device, a DC magnetron sputtering device was used. For comparison, a medium of a conventional case, in which an underlying layer only composed of a Cr layer was formed to 1,000 Å without forming the film of the seed layer, was fabricated under the same conditions.

Figure 2:
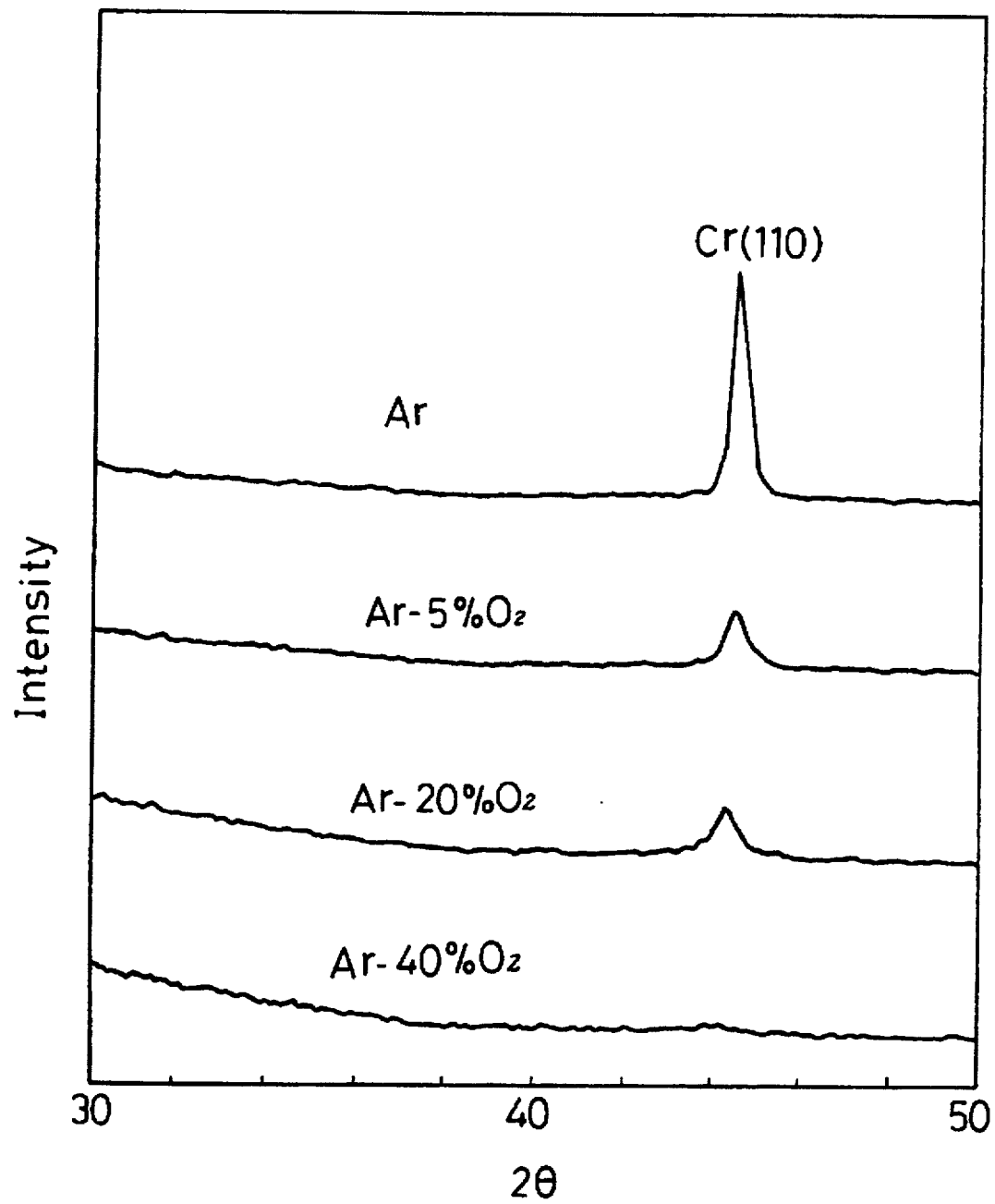
FIG. 2 is an X-ray diffraction pattern of seed layers formed in an Ar—$O_2$ mixed gas atmosphere at various $O_2$ concentrations.

(2) The seed layer was formed to 1,000 Å under the same conditions, and applied by X-ray diffraction, to examine the crystal structure of the seed layer. The results are shown in FIG. 2. As can be seen from FIG. 2, Cr (110) orientation is eliminated at a $O_2$ gas concentration of 40 vol %, to reveal that an amorphous state is apparently attained in view of X-ray observation.

Figure 3:
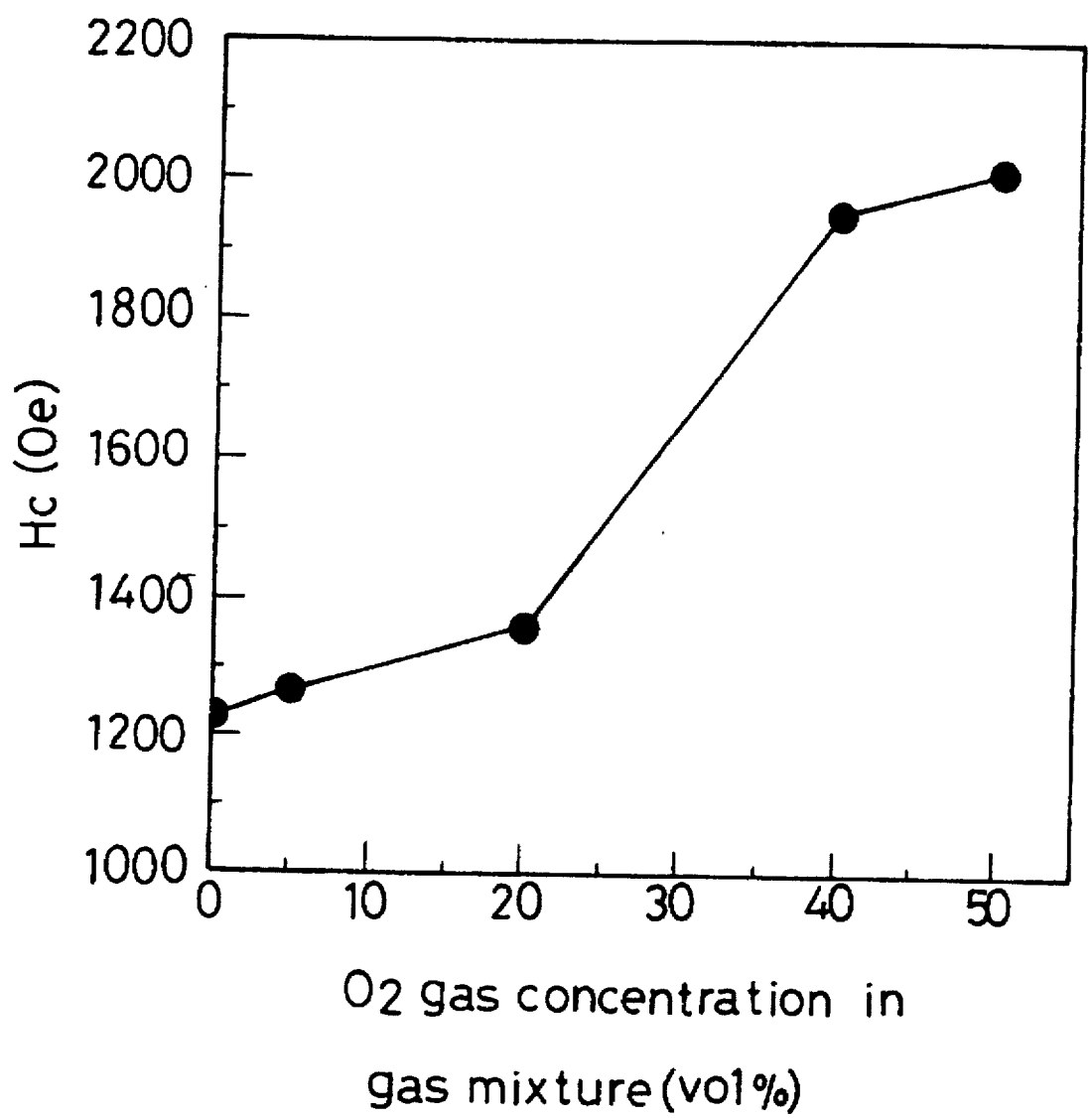
FIG. 3 is a graph showing a relationship between $O_2$ concentration in an Ar—$O_2$ mixed gas upon formation of a seed layer and a coercive force of a magnetic recording medium.

(3) Using the thus obtained magnetic recording medium, a coercive force (Hc) was measured by VSM (Vibrating Sample Magnetometer) under an external magnetic field of 10 kOe. The results are shown in FIG. 3. It can be seen from the figure that a high coercive force of greater than 1,600 Oe was obtained at an $O_2$ gas concentration of higher than 30 vol %.

Figure 4:
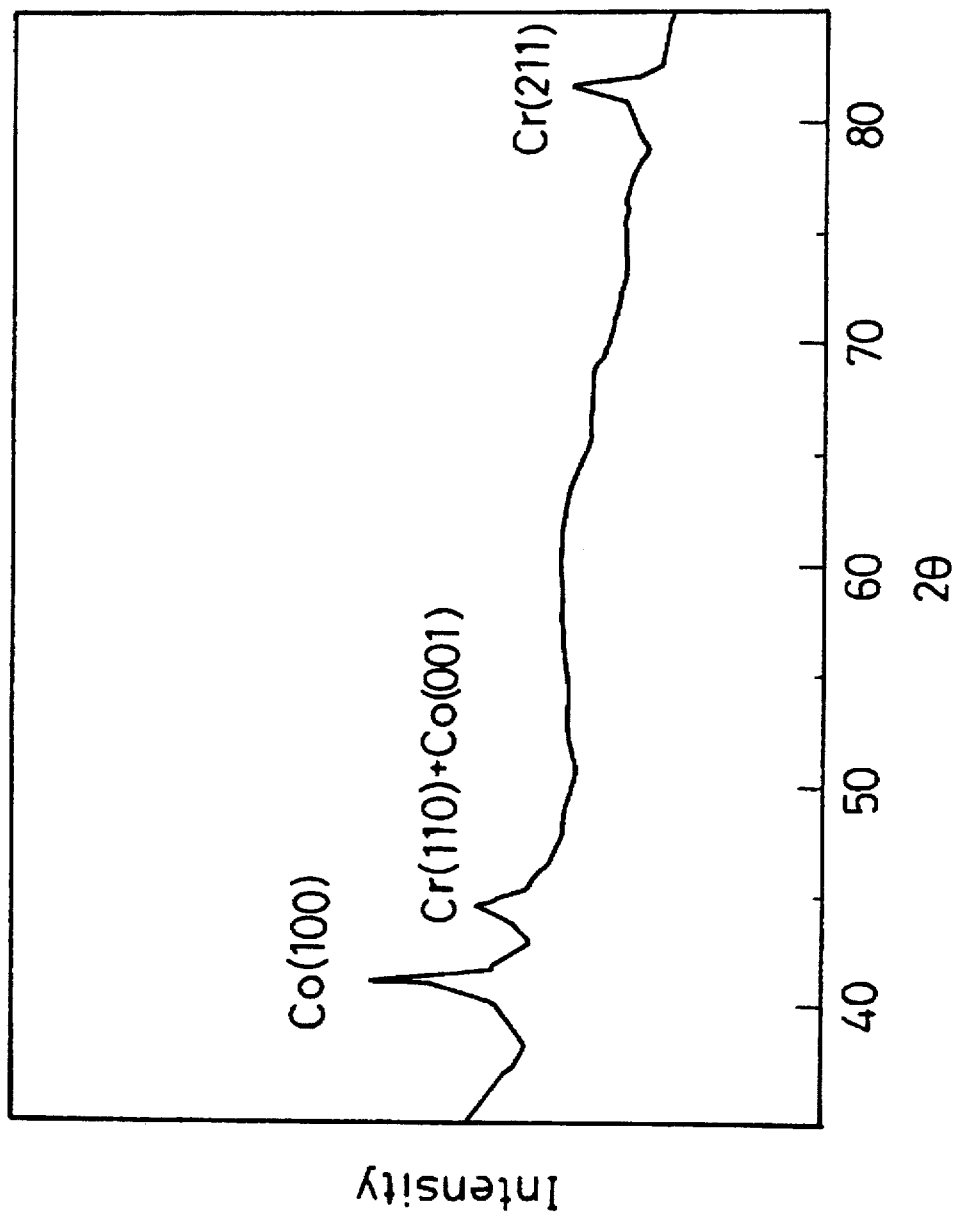
FIG. 4 is an X-ray diffraction pattern of a magnetic recording medium having a seed layer formed in an Ar-40 vol % $O_2$ mixed gas atmosphere.

(4) X-ray diffraction was conducted by using the magnetic recording medium of the example in which the seed layer was sputtered in a mixed gas atmosphere of Ar—40vol% $O_2$, to examine the crystal structure of the underlying Cr layer and the magnetic layer. The results are shown in FIG. 4. It can be recognized from the figure that the crystal structure of the Co-alloy has a main peak at (100) although it partially contains (001) (overlapping a peak for Cr (110)). On the other hand, it can be seen for the crystal orientation of Cr that (211) is predominant, although (110) is contained. Further, since the seed layer and the protection layer are amorphous, crystal orientation of them do not appear in the X-ray diffraction pattern.

EXAMPLE B (1) To two kinds of substrates, namely, an Al-alloy—NiP substrate applied with isotropic texturing and a glass substrate, Cr was sputtered at a substrate temperature set to a room temperature and in an Ar—$O_2$ gas mixture (pressure of the gas mixture of 15 mTorr) in which $O_2$ gas concentration was set to 40 vol %, to form seed layers of various thicknesses. Then, at a substrate temperature of 270° C. and under an Ar gas pressure of 8 mTorr, were formed the underlying Cr layer to 1000 Å, and a magnetic layer of Co—10at % Cr—4at % Ta to 400 Å by sputtering continuously. In this case, a bias voltage was applied at −300 V to the Al-alloy—NiP substrate and at −100V to the glass substrate. As the film forming device, a DC magnetron sputtering device was used in the same manner as in Example A.

Figure 5:
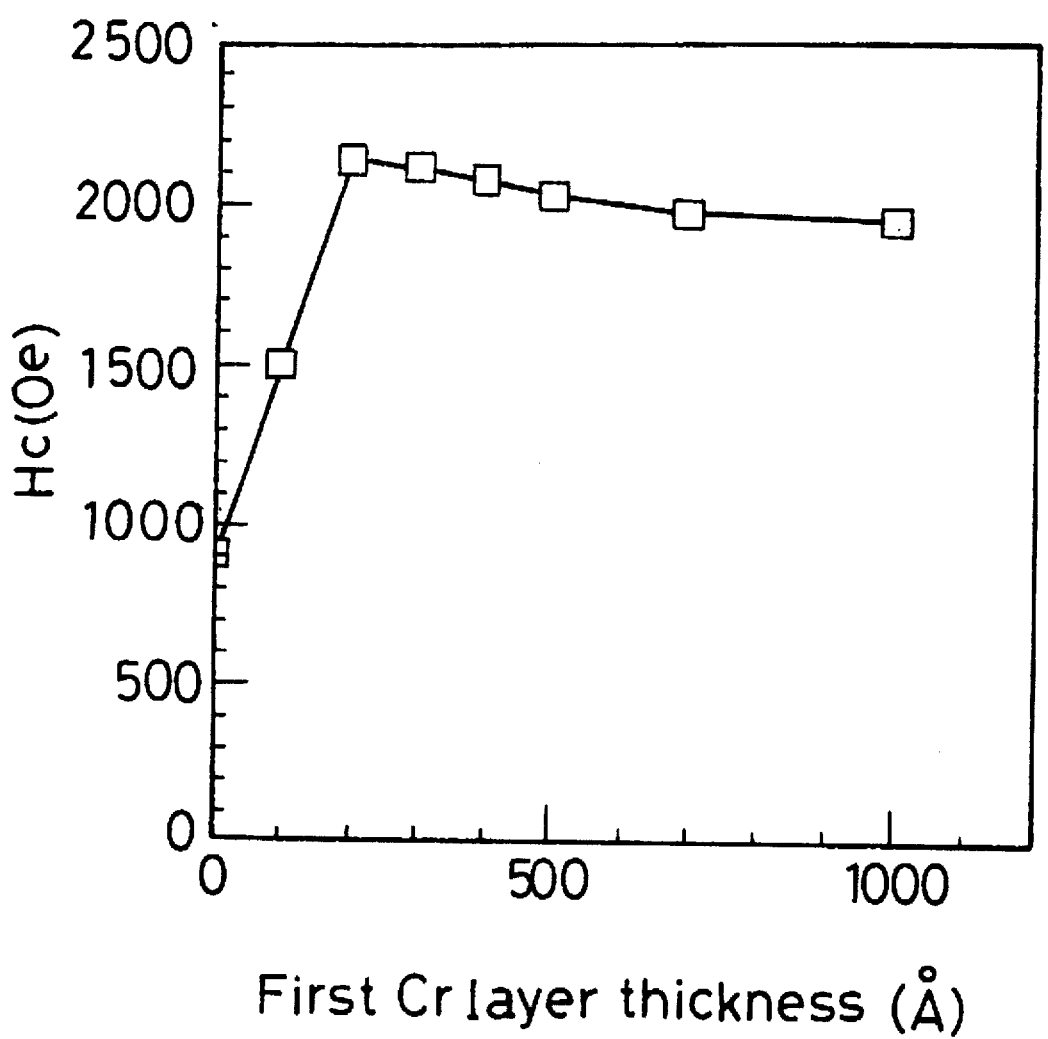
FIG. 5 is a graph showing a relationship between the thickness of a seed layer and the coercive force of a magnetic recording medium in a preferred embodiment.
Figure 6:
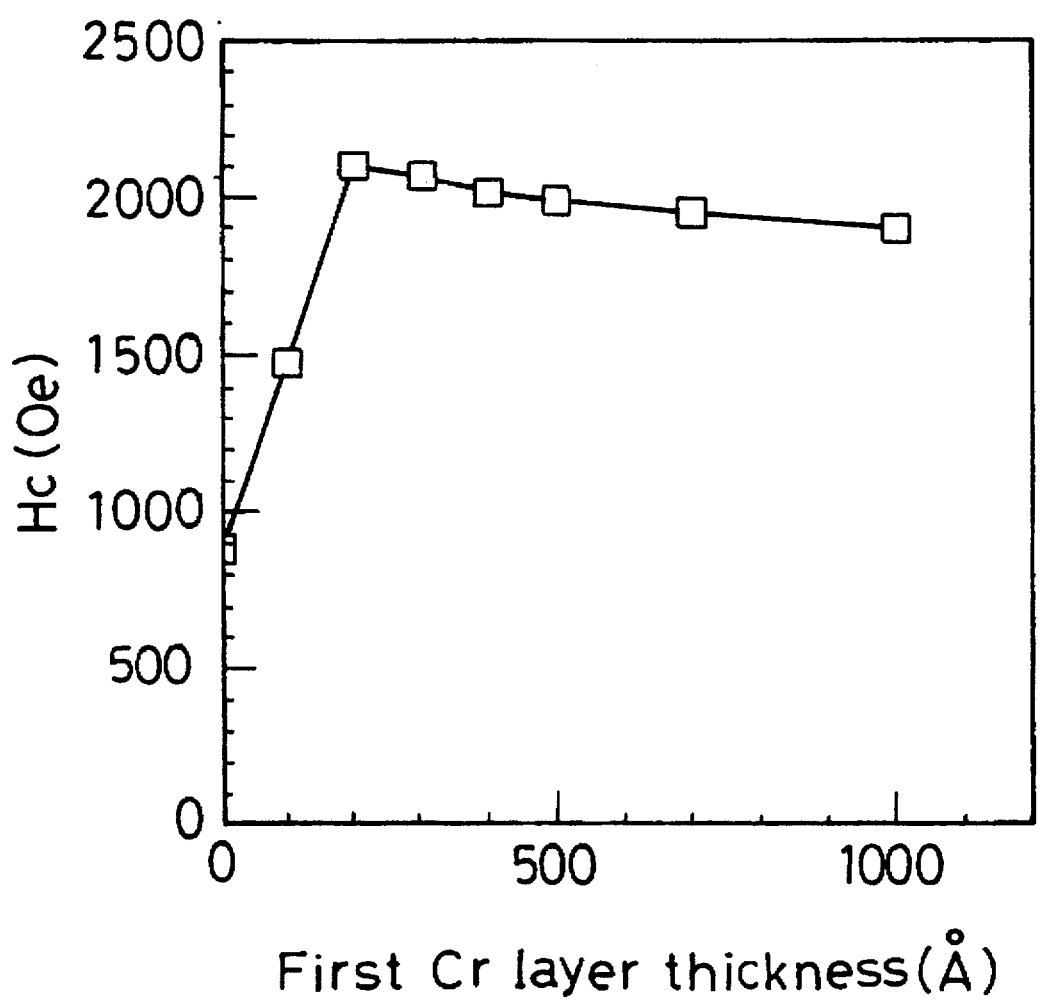
FIG. 6 is a graph showing a relationship between the thickness of a seed layer and the coercive force of a magnetic recording medium in another preferred embodiment.

(2) Using the thus obtained magnetic recording medium, change of the coercive force relative to the change of the thickness of the seed layer was measured by VSM under an external magnetic field of 10 kOe. FIG. 5 shows the results for the measurement of the Al-alloy—NiP substrate medium and FIG. 6 shows the results for the measurement of the medium of the glass substrate respectively. It can be seen from FIGS. 5 and 6 that a high coercive force can be obtained with a thickness of the seed layer of greater than 100 Å, particularly, greater than 200 Å in each of the cases.

EXAMPLE C (1) On a crystallized glass substrate applied with isotropic texturing, was formed a seed layer comprising a composition shown in Table 1 to 500 Å by sputtering at a substrate temperature of 170° C. using the sputtering gas shown in Table 1 under a gas pressure of 15 mTorr.

(2) Then, at a substrate temperature of 320° C. and under an Ar gas pressure of 8 mTorr, were formed an underlying Cr layer to 1,000 Å, a magnetic layer of Co—10at % Cr—4 at % Ta to 350 Å and a C protection film was formed to 200 Å continuously by sputtering. In this case, a bias voltage was applied at −100 V to the substrate upon forming the underlying layer and at −150V to the substrate upon forming the magnetic layer.

(3) Using the thus obtained magnetic medium, a coercive force was measured by VSM under an external magnetic field of 10 kOe. The results are also shown in Table 1. It can be seen from the table that excellent coercive force of greater than 2,000 Oe was obtained in all of specimens Nos. 1–6 in the example.

TABLE 1

| Specimen Nos. | Seed layer composition (at %) | Sputtering gas (vol %) | Coercive force (Oe) |
|---|---|---|---|
| 1 | (Cr)—O | Ar—50% O$_2$ | 2150 |
| 2 | (V)—O | Ar—50% O$_2$ | 2180 |
| 3 | (Ti)—O | Ar—50% O$_2$ | 2070 |
| 4 | (Cr—35% Si)—O | Ar—30% O$_2$ | 2100 |
| 5 | (V—40% Si)—O | Ar—30% O$_2$ | 2120 |
| 6 | (Ti—40% Si)—O | Ar—30% O$_2$ | 2090 |

(Note)
Composition of the target is shown in ( ) of the composition of the seed layer.

EXAMPLE D (1) On a crystallized glass substrate applied with isotropic texturing, a seed layer comprising the composition shown in Table 2 was formed to 500 Å by sputtering at a substrate temperature of 170° C. using an Ar gas as a sputtering gas and under a gas pressure of 15 mTorr. For the specimen Nos. 2 and 3, an oxygen-containing layer was further formed by implantation of oxygen atoms to the surface of an amorphous alloy layer in an oxygen gas plasma atmosphere. The conditions for the treatment were: an oxygen gas flow rate of 400 mTorr, a plasma maintaining power of 350 W and a treatment time of 10 min.

(2) Then, under the same condition as those in Example C, were formed an underlying Cr layer to 1,000 Å, a magnetic layer of Co—10 at % Cr—4 at % Ta to 350 Å and a C protection film to 200 Å continuously.

(3) Using the thus obtained magnetic medium, coercive force was measured by VSM under an external magnetic field of 10 kOe. The results are also shown in Table 2. It can be seen from the table that excellent coercive force of greater than 2,000 Oe was obtained in all of specimen Nos. 2 and 3 in the example. As apparent particularly from specimen Nos. 1 and 3, the coercive force can be improved remarkably by implantation of oxygen atoms.

TABLE 2

| Specimen Nos. | Seed layer composition (at %) | Sputtering gas (vol %) | Coercive force (Oe) | Remarks |
|---|---|---|---|---|
| 1 | Cr—35% Si | Ar | 1970 | |
| 2 | Ti—40% Si | Ar | 2060 | * |
| 3 | Cr—35% Si | Ar | 2080 | * |

(Note)
*After forming the seed layer, implantation treatment is applied.

EXAMPLE E

On a crystallized glass substrate applied with isotropic texturing, was formed a seed layer comprising the composition shown in FIG. 3 to 500 Å at a substrate temperature of 170° C. using the sputtering gas as shown in Table 3 and under a gas pressure of 15 mTorr. Specimen Nos. 1 to 4 are examples and specimen No. 5 is a comparative example in which the seed layer comprises crystalline Cr.

(2) Then, under the same conditions as those in Example C, were formed an underlying Cr layer to 1,000 Å, a magnetic layer of Co—10 at % Cr—4 at % Ta to 350 Å and a C protection film to 200 Å continuously.

(3) Using the thus obtained magnetic recording medium, coercive force was measured by VSM under an external magnetic field of 10 kOe. The results are also shown in Table 3. It can be seen from the table that excellent coercive force of greater than 2100 Oe was obtained for all of the specimen Nos. 1 to 4 in the example but the coercive force of the specimen No. 5 of the comparative example showed an extremely lower value as compared with example.

TABLE 3

| Specimen Nos. | Seed layer composition (at %) | Sputtering gas (vol %) | Coercive force (Oe) | Remarks |
|---|---|---|---|---|
| 1 | Cr—20% Ta | Ar | 2140 | |
| 2 | Cr—15% Ta—7% N | Ar—30N$_2$ | 2160 | |
| 3 | V—22% Ta | Ar | 2170 | |
| 4 | V—17% Ta—10% N | Ar—30N$_2$ | 2150 | |
| 5 | Cr | Ar | 1750 | * |

Note:
*Seed layer is crystalline.

What is claimed is:

1. A metal thin film magnetic recording medium, comprising:
   (i) a non-magnetic substrate;
   (ii) a seed layer on said substrate;
   (iii) an underlying non-magnetic layer, comprising Cr, on said seed layer; and
   (iv) a magnetic layer, comprising a Co-alloy having a uni-axial magnetocrystalline anisotropy, on said underlying non-magnetic layer;
wherein said seed layer comprises an oxygen-containing non-magnetic metal and said oxygen-containing non-magnetic metal is amorphous as determined by X-ray diffraction.

2. A metal thin film magnetic recording medium as defined in claim 1, wherein the thickness of the seed layer is greater than 100 Å.

3. A metal thin film magnetic recording medium as defined in claim 1, wherein the seed layer is an oxygen-containing amorphous Cr-alloy or V-alloy.

4. A metal thin film magnetic recording medium as defined in claim 1, wherein a protection layer is laminated on the magnetic layer.

5. A metal thin film magnetic recording medium as defined in claim 4, wherein a lubrication layer is laminated on the protection layer.

6. A metal thin film magnetic recording medium as defined in claim 1, further comprising (v) another non-magnetic layer comprising Cr, adjacent to said magnetic layer.

7. A metal thin film magnetic recording medium, comprising:
   (i) a non-magnetic substrate;
   (ii) a seed layer on said substrate;
   (iii) an underlying non-magnetic layer, comprising Cr, on said seed layer; and (iv) a magnetic layer, comprising a Co-alloy having a uni-axial magnetocrystalline anisotropy, on said underlying non-magnetic layer;

wherein said seed layer comprises a non-magnetic metal alloy, said alloy is amorphous as determined by X-ray diffraction, and the surface of said non-magnetic alloy, opposite said substrate, contains oxygen.

8. A metal thin film magnetic recording medium as defined in claim 7, wherein the thickness of the seed layer is greater than 100 Å.

9. A metal thin film magnetic recording medium as defined in claim 7, wherein the seed layer is an oxygen-containing amorphous Cr-alloy or V-alloy.

10. A metal thin film magnetic recording medium as defined in claim 7, wherein a protection layer is laminated on the magnetic layer.

11. A metal thin film magnetic recording medium as defined in claim 10, wherein a lubrication layer is laminated on the protection layer.

12. A metal thin film magnetic recording medium as defined in claim 7, further comprising (v) another non-magnetic layer comprising Cr, adjacent to said magnetic layer.

13. A metal thin film magnetic recording medium, comprising:

(i) a non-magnetic substrate;

(ii) a seed layer on said substrate;

(iii) an underlying non-magnetic layer, comprising Cr, on said seed layer; and (iv) a magnetic layer, comprising a Co-alloy having a uni-axial magnetocrystalline anisotropy, on said underlying non-magnetic layer;

wherein said seed layer comprises an Cr-alloy or V-alloy, both said Cr-alloy and V-alloy comprising at least one element selected from the group consisting of Ta, Nb, Si, Al and C, and said Cr-alloy or V-alloy is amorphous as determined by X-ray diffraction.

14. A metal thin film magnetic recording medium as defined in claim 13, wherein the thickness of the seed layer is greater than 100 Å.

15. A metal thin film magnetic recording medium as defined in claim 13, wherein the Cr- or V-alloy is an alloy containing Ta.

16. A metal thin film magnetic recording medium as defined in claim 13, wherein a protection layer is laminated on the magnetic layer.

17. A metal thin film magnetic recording medium as defined in claim 16, wherein a lubrication layer is laminated on the protection layer.

18. A metal thin film magnetic recording medium as defined in claim 13, further comprising (v) another non-magnetic layer comprising Cr, adjacent to said magnetic layer.

19. A metal thin film magnetic recording medium, comprising:

(i) a non-magnetic substrate;

(ii) a seed layer on said substrate;

(iii) an underlying non-magnetic layer, comprising Cr, on said seed layer; and (iv) a magnetic layer, comprising a Co-alloy having a uni-axial magnetocrystalline anisotropy, on said underlying non-magnetic layer;

wherein said seed layer comprises a Cr-alloy or V-alloy comprising at least 40 at % Cr or V, and said Cr-alloy or V-alloy is amorphous as determined by X-ray diffraction.

* * * * *